United States Patent [19]

Weiss

[11] Patent Number: 4,938,918

[45] Date of Patent: Jul. 3, 1990

[54] ELEMENT IMMERSED IN COOLANT OF NUCLEAR REACTOR

[75] Inventor: Albert Weiss, Whitehall, Pa.

[73] Assignee: Westinghouse Electric Corp., Pittsburgh, Pa.

[21] Appl. No.: 405,597

[22] Filed: Sep. 11, 1989

Related U.S. Application Data

[60] Continuation of Ser. No. 163,140, Feb. 24, 1988, abandoned, which is a continuation of Ser. No. 802,563, Nov. 27, 1985, abandoned, which is a division of Ser. No. 570,487, Jan. 13, 1984, Pat. No. 4,608,109.

[51] Int. Cl.$^5$ ............................................. G21C 21/00
[52] U.S. Cl. .................................... 376/260; 376/261; 376/327; 376/426; 29/421.1; 29/515; 29/517
[58] Field of Search ............... 376/426, 429, 416, 417, 376/414, 333, 455, 453, 260, 261, 327

[56] References Cited

U.S. PATENT DOCUMENTS

| | | | |
|---|---|---|---|
| 3,085,954 | 4/1963 | Stohr et al. | 376/426 |
| 3,093,888 | 6/1963 | Huguley | 29/520 |
| 3,105,030 | 9/1963 | McGeary et al. | 376/426 |
| 3,118,222 | 1/1964 | Beernaert | 376/426 |
| 3,192,621 | 7/1965 | Bauer et al. | 376/426 |
| 3,376,201 | 4/1968 | Bain | 376/426 |
| 3,461,523 | 8/1969 | Peehs et al. | 29/520 |
| 3,556,870 | 1/1971 | Debray et al. | 376/416 |
| 3,679,545 | 7/1972 | Leirvik | 376/426 |
| 4,233,086 | 11/1980 | Vesterlund | 376/417 |
| 4,343,659 | 8/1982 | Murakami et al. | 376/416 |
| 4,432,934 | 2/1984 | Gjertsen et al. | 376/333 |

FOREIGN PATENT DOCUMENTS

| | | | |
|---|---|---|---|
| 702212 | 1/1965 | Canada | 29/515 |
| 1146832 | 4/1963 | Fed. Rep. of Germany | 376/416 |
| 1244632 | 9/1960 | France | 376/426 |
| 0071485 | 4/1983 | Japan | 376/327 |

*Primary Examiner*—Harvey E. Behrend
*Attorney, Agent, or Firm*—H. Diamond

[57] ABSTRACT

The zirconium cladding of a coolant-displacement rod of a nuclear reactor is precollapsed in the zirconium oxide stack of pellets which supports the cladding. Current is conducted through the cladding in an atmosphere at reduced pressure containing residual oxygen, to heat the cladding to a temperature at which its yield strength is reduced. Then, while the rod remains at this temperature, it is subjected to isostatic pressure which collapses the cladding uniformly. The formation, by reason of exposure to neutron flux, of a long unsupported gap in the cladding which might be collapsed under the pressure of the coolant is precluded. In addition, the rod retains its symmetry. The outer surface of the cladding is oxidized, facilitating the movement of the rod into its thimbles of the core and improving the resistances of the cladding to reaction with the coolant.

7 Claims, 2 Drawing Sheets

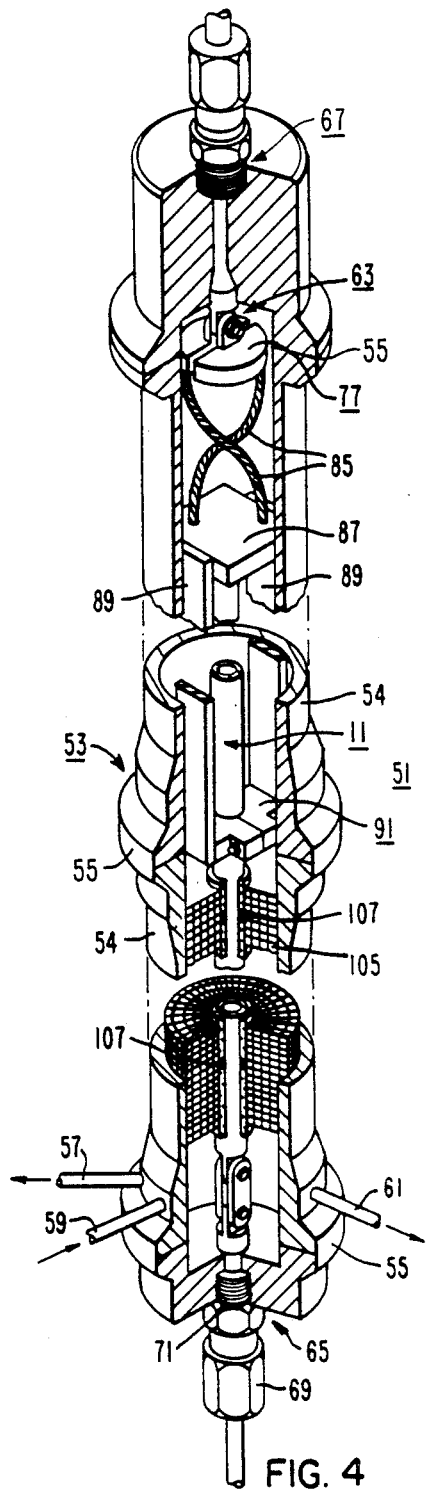
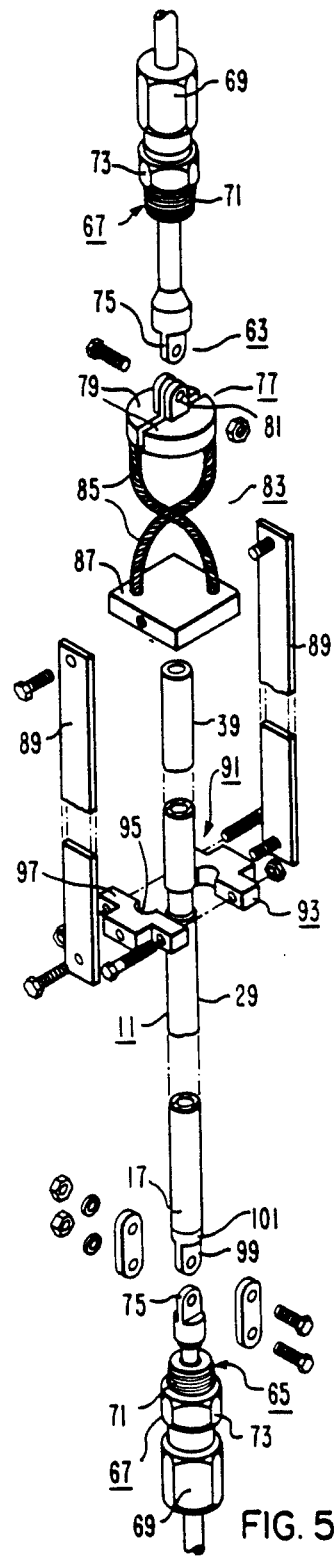
FIG. 4
FIG. 5

ELEMENT IMMERSED IN COOLANT OF NUCLEAR REACTOR

This application is a continuation of application Ser. No. 07/163,140 filed Feb. 24, 1988 now abandoned, which is a continuation of application Ser. No. 06/802,563 filed Nov. 27, 1985 now abandoned, which is a division of application Ser. No. 06/570,487 filed Jan. 13, 1984, now U.S. Pat. No. 4,606,109 granted Aug. 14, 1986.

Application Ser. No. 570,551, filed Jan. 13, 1985, now U.S. Pat. No. 4,725,401 to Robert K. Gjertsen et al. for "Element Immersed in Coolant of Nuclear Reactor", now U.S. Pat. No. 4,725,401 assigned to Westinghouse Electric Corporation, is incorporated herein by reference.

BACKGROUND OF THE INVENTION

This invention relates to nuclear reactors and it has particular relationship to the elements of a nuclear reactor which are immersed in its coolant. Among such elements are fuel elements and control elements of fuel assemblies. In addition, there are coolant-displacement rods. Coolant-displacement rods are immersed in the coolant of a nuclear reactor when the nuclear-reactor plant is started up and at the beginning of each refueling cycle (typically 18 months). They reduce the moderation of the neutron flux, which would be produced by the coolant, by displacing the coolant. After the reactor has been in operation for some time (typically 10 months of each cycle), these coolant-displacement rods are withdrawn from the coolant.

The nuclear reactor elements each includes a stack of pellets enclosed in cladding. A fuel element includes a stack of pellets of fissionable or fertile materials, such as uranium, plutonium or thorium, or certain of their compounds, enclosed in cladding. The cladding may be a zirconium alloy or stainless steel. A control element includes pellets of a neutron absorbing material, such as natural boron or boron 10 or their compounds, enclosed in cladding. A coolant-displacement rod, which is herein also categorized under the heading "element", includes a stack of zirconium-oxide pellets enclosed in cladding of a zirconium alloy. The above-identified Gjertsen et al. patent discloses a coolant-displacement rod in which a portion of the outer surfaces of certain of the pellets distributed along the stack are depressed.

In the interest of dealing in concrete concepts, this invention is described in detail herein as applied predominantly to coolant-displacement rods in which the outer surfaces of all pellets are alike, typically circularly cylindrical as disclosed in Gjertsen et al. patent. This invention is uniquely applicable to such rods. To the extent that this invention is applicable to nuclear-reactor elements of other types, such application is within the scope of equivalents of this invention. Coolant-displacement rods are used predominantly in nuclear reactors of the pressurized-water type. This invention is not confined to pressurized-water reactors and to the extent that it or its principles are embodied in reactors of other types, such embodiment is within the scope of equivalents thereof.

It has been found that when a coolant-displacement rod is exposed to high energy neutron-flux, the cladding of zirconium alloy grows or creeps axially while the zirconium oxide remains dimensionally stable. This growth of the cladding is permanent and progressive. The cladding does not retract axially, as happens for thermal expansion when the rod is removed from the flux environment. The permanent growth increases as the exposure to the flux progresses. The life of a reactor is about 40 years. Over this time interval, an unsupported gap of as much as 7 inches may be developed in the pellet stack usually at the upper end of the rod. At the temperature, pressure and flux of the coolant in the reactor, cladding at the unsupported gap would collapse. Distortion of collapsed cladding would cause jamming of a rod in its guide tube or thimble, not only restricting the axial movement of the rod with the collapsed cladding, but also restricting the movement of the whole associated coolant-displacement-rod assembly. Typically there are 24 rods in an assembly. Restriction of the movement of these rods would materially deteriorate the operation of the reactor.

Because of the demands imposed during the manufacture of the coolant-displacement rods, there is a small clearance, typically 0.006 to 0.008 inch, between the inner diameter of the cladding and the outer diameter of the pellets. In the operation of a nuclear reactor, these rods are exposed, not only to neutron flux, but also to coolant at a high temperature, typically 600° F., and at a high pressure, typically 2250 pounds per square inch. Under these conditions, the cladding may engage the pellets non-uniformly, thus degrading the operation of the reactor.

It is an object of this invention to prevent the formation, in a coolant-displacement rod of a nuclear reactor, of an excessively long unsupported gap, which might collapse in the environment of the coolant of the reactor, as a result of the growth or creep of the cladding when exposed to neutron flux. It is also an object of this invention to preclude coolant-displacement rods from becoming non-uniform in transverse cross-section when exposed to the coolant of a nuclear reactor during operation. A more general object of this invention is to prevent a cladded element which is immersed in the coolant of a nuclear reactor from forming unsupported gaps under the cladding and from suffering radial deformation as a result of the exposure of the element to neutron flux.

SUMMARY OF THE INVENTION

In accordance with this invention the cladding of a coolant-displacement rod, or of other element immersed in the coolant, is pre-collapsed on the pellets, i.e., brought into engagement with the pellets, as a final step in the making of the element. The pellets are packed tightly in the stack. When an element so made is exposed to neutron flux, the cladding, in engagement with the pellets, resists axial expansion and an unsupported gap is not formed.

In the practice of this invention the cladding of the element is heated to an elevated temperature at which its yield strength is substantially reduced. Then, while the cladding is at the elevated temperature, pressure is applied to the element to collapse the cladding on the stack of pellets. The pressure is applied isostatically by a gas which envelopes the element. The cladding is collapsed uniformly so that the element maintains its radial symmetry. Since the processing of the element in accordance with this invention is the last step in its manufacture, each completed element may be inspected for radial symmetry and non-symmetric elements rejected. Reliability of the operation of the numerous elements in a reactor may be assured. The cladding is, in the practice of this invention, heated in an atmosphere containing oxygen and its external surface is oxidized. The movement of the element in its receptacles or thimbles in the core of the reactor is facilitated and reaction of the cladding with the coolant is minimized.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 4 is a view in isometric with part of the wall broken away of apparatus for processing the rod shown in FIGS. 1 through 3 in accordance with this invention; and FIG. 5 is an exploded view in isometric showing the manner in which the cladding is connected to be heated by conduction of electrical current.

DETAILED DESCRIPTION OF THE PREFERRED EMBODIMENTS

Figure 1:
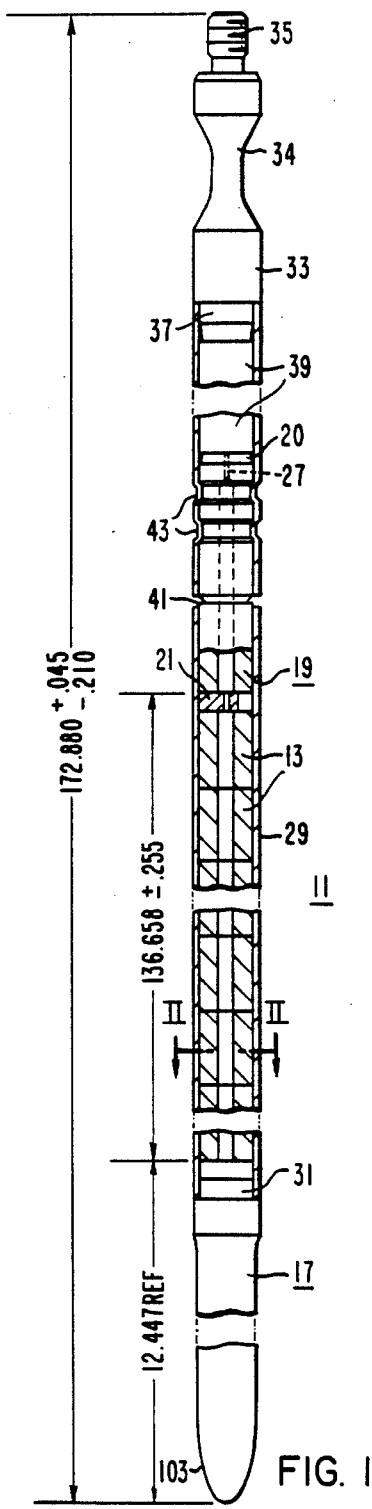
FIG. 1 is a view in side elevation, partly in longitudinal section, showing a coolant-displacement rod which is processed in the practice of this invention.
Figure 2:
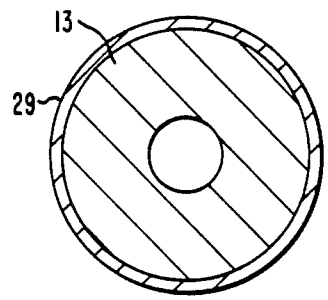
FIG. 2 is a view in transverse section taken along line II—II of FIG. 1.
Figure 3:
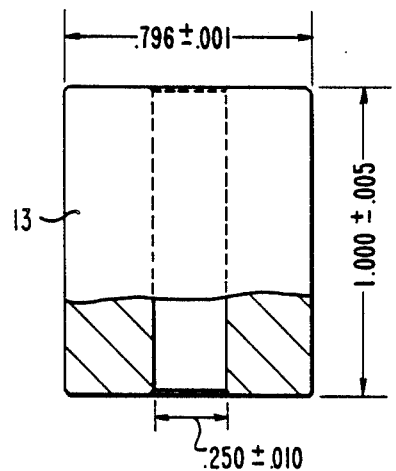
FIG. 3 is a view in side elevation, partly in longitudinal section, of a pellet of the coolant-displacement rod shown in FIG. 1.

FIGS. 1 through 3 show a coolant-displacement rod 11. The rod 11 includes a stack of pellets 13 interposed between a tapered end plug 17 and a mid plug 19. The pellets 13 are of hollow circularly cylindrical shape. The mid plug 19 terminates in a chamfer 20 at its inner end. The rod 11 is immersed in the coolant with the end plug 17 downwardly. The expression "outer end" means the end towards the end plug 17, "inner end" means the end away from this end plug. A spacer 21 is interposed between innermost pellet 13 of the stack and the mid plug 19. The end plug 17 is solid. The mid plug 19 is in the form of a hollow circular cylinder terminating at its inner end in a central hole 27 of small diameter.

The pellets are enclosed in cladding 29 which extends from a stem 31 at the inner end of the end plug 17 to a position along the mid plug 19. The end plug 17, the mid plug 19. The spacer 21 and the cladding 29 are composed of an alloy whose composition is predominantly zirconium. A typical such alloy is ZIRCALOY-4 whose typical composition is presented in the Gjertsen et al. patent.

At its outer end, the cladding 29 is welded pressure tight to the shoulder of the end plug 17 formed by the stem 31. At its inner end, the cladding is welded pressure tight to the surface of the mid plug 19. When the welding is completed, the air is exhausted through hole 27 from the space enclosed by the cladding and the space is back-filled with an inert gas such as helium at about atmospheric pressure. The hole 27 is sealed pressure tight by a weld. Reaction of components of air such as oxygen and water vapor internally with the ZIRCALOY alloy is thus precluded.

At the end opposite the end 17, the rod 11 includes a plug 33 having an extension 34 terminating in a threaded tip 35. The tip 35 serves to connect the rod 11 to the rod drive (not shown). The plug 33 has a stem 37 defining a shoulder. A tube 39 extends between this shoulder, to which it is welded, and the mid plug 19 and abuts the weld 41 between the cladding 29 and the mid plug 19. The tube 39 is secured to the mid plug 19 by circular swaged joints 43. The plug 33 and the tube 39 are composed of stainless steel. The tube 39 is vented.

The rod 11 is immersed in the coolant with the tapered end 17 downwardly. The taper 103 facilitates the entry of the rod into the thimble which receives the rod. The whole rod including the tube 39 is bathed by the coolant. Typically, the pressure of the coolant is about 2250 pounds per square inch. The temperature of the coolant while the reactor is in operation is about 600° F. Since the tube 39 is vented, the coolant penetrates into the tube and there is no differential in pressure across the tube wall. There is substantial pressure against the cladding 29. The thermal expansion of the pellets 13, the cladding 29 and the tube 39 is reversible. The axial expansion of the cladding which results from the flux is permanent. Over the life of a reactor in which a rod 11 is installed, the expansion would produce an unsupported gap under the cladding 29 which typically may be as long as 7 inches. Under the pressure of the coolant and at its temperature the cladding over the gap would collapse. In this state, the cladding might prevent the coolant-displacement assembly from moving upwardly or downwardly. In addition, the creep of the cladding would produce non-uniformity in the transverse cross-sectional dimension of the rod 11 along its length. The purpose of this invention is to prevent such maloperation. This purpose is achieved by processing the rod 11 with the apparatus 51 shown in FIGS. 4 and 5.

This apparatus 51 includes an elongated pressure vessel 53 formed of hollow circularly cylindrical sections 54 joined by pressure-tight flanges 55. Pressure-tight flanges sold under the name GRAY-LOC pressure flanges or the equivalent may be used. The sections 54 are essentially pipes composed of mild steel joined by the flanges 55. Near its lower end, the vessel 51 is provided with an exhaust outlet 57, an inlet 59 for supplying gas to pressurize the vessel and an outlet 61 for depressurizing the vessel.

The cladding 29 is heated by conducting electrical current through it. The current is supplied through upper-terminal assembly 63 and lower-terminal assembly 65 (FIG. 5). The upper-terminal assembly 63 includes a feed-through 67 (FIG. 5) for producing a pressure-tight joint at the upper end of the vessel 51. A CONAX feed through or the equivalent may be used. The feed-through 67 includes a hexagonal head 69 connected to a conical threaded member 71 with which a nut 73 meshes. The member 71 engages a thread (not shown) in the upper end of the vessel 51 (FIG. 4) and when tightened by the nut 73 produces a pressure-tight joint. At its lower end the feed-through 67 carries an eyelet 75 which is secured to a clevis 77 formed of abutting semicircular plates 79 from each of which an eyelet 81 extends. The eyelet 75 is bolted to the clevis 77. The clevis 77 is connected to an expansion joint 83 including flexible conductors 85 connected between each plate 79 and a plate 87. The upper-terminal assembly also includes a plurality of strips 89 and a clamping unit 91 (FIG. 5). The clamping unit 91 includes clamping jaws 93 having semicircular seats 95, dimensioned to engage the cladding 29. Flanges 97 extend from the seats 95. The jaws 93 are abutted and secured by bolts through the flanges 97 with the seats 95 engaging the upper end of the cladding 29 in good electrical contact. The strips 89 are bolted to the jaws 93 at their lower end and to the plate 87 at their upper end. Current is supplied to the cladding 29 through the feed-through 67, the clevis 77, conductors 85, plate 87, strips 89 and clamping unit 91.

The lower-terminal assembly 65 is similar to the upper-terminal assembly 63 except that the lower assembly 65 does not include the expansion joint. Instead, the eyelet 75 is secured to an eyelet 99 extending from a cap 101 mounted on the tapered end 103 (FIG. 1) of the end plug 17 of the coolant-displacement rod 11.

In the practice of this invention, the coolant-displacement rod 11 with its cladding 29 and the tube 39 is mounted within the vessel 51 enclosed in a thermally insulating cylinder 105 (FIG. 4). The cylinder 105 has internal ceramic buttons 107 for centering the rod 11. Initially, the cylinder 51 is exhausted through exhaust outlet 61 by a "roughing" pump operated typically for about one-half hour. The pressure in the vessel 51 is reduced typically to about 500 to 1000 microns.

Next, current, typically about 200 amperes, is supplied through the terminal assemblies 63 and 65. Since the zirconium oxide pellets 13 are electrical insulators, the current is conducted through the cladding 29. The cladding is heated to about 1000° F. At this temperature the outer surface of the cladding is oxidized by the residual oxygen in the vessel 51 which is just sufficient to accomplish this purpose. With the cladding maintained at 1000° F., an inert gas, typically argon, is admitted through inlet 59 to increase the pressure in the vessel 51 typically to about 1500 to 1600 pounds per square inch. With the cladding at the elevated temperature, its yield strength is reduced and the pressure in the vessel is sufficient to collapse the cladding 29 on the pellets 13. Since the pressure is isostatic, i.e., uniform throughout, the cladding is collapsed uniformly. The gas is then exhausted through outlet 61, the vessel 51 is disassembled and the processed coolant-displacement rod is removed.

While preferred embodiments of this invention are disclosed herein, many modifications thereof are feasible. This invention is not to be restricted except insofar as is necessitated by the spirit of the prior art.

I claim:

1. The method of processing a coolant-displacement rod of a nuclear reactor, preparatory to the installation of said rod in said nuclear reactor, to preclude the formation undesirably of an unsupported permanent axial gap in the cladding of said rod over the anticipated time of use of the rod in said nuclear reactor by reason of neutron bombardment of the rod, which gap would be collapsible under the force exerted by the coolant of said nuclear reactor, said rod including a stack of zirconium-oxide pellets in cladding of an alloy of zirconium, the inner surface of said cladding prior to said processing being spaced from the outer surfaces of said pellets; the said method including: mounting said rod in a container and evacuating said container from atmospheric pressure to a pressure such that said rod is in an attenuated atmosphere containing residual oxygen not combined chemically with any other chemical element, thereafter conducting electrical current only through said cladding to heat said cladding to a temperature at which the yield strength of said cladding is substantially reduced and, while said rod is maintained at said temperature adding a gas to apply pressure uniformly to said cladding of a magnitude sufficient at said temperature to collapse said cladding uniformly on the outer surface of said pellets of said stack while said rod maintains its radial symmetry, the outer surface of the cladding being oxidized at said temperature by said residual oxygen, the said processing, precluding the formation, by exposure to neutron flux, over the period of time over which said rod will later be in use in a reactor, of an unsupported axial gap in said cladding which would collapse under the pressure and at the temperature, of the coolant of said nuclear reactor.

2. The method of claim 1 including applying isostatic pressure to collapse the cladding.

3. The method of processing an element of a nuclear reactor, preparatory to installation of said element in said nuclear reactor, to preclude the formation undesirably of an unsupported permanent axial gap in the cladding of said element over the anticipated time of use of the element in said nuclear reactor by reason of neutron bombardment of the element, which gap would be collapsible under the force exerted by the coolant of said nuclear reactor, said element including a stack of separate pellets enclosed in metallic cladding, the inner surface of the cladding prior to said processing being spaced from the outer surfaces of the pellets; the said method including: mounting said element in a container and evacuating said container from atmospheric pressure to a pressure such that said element is in an attenuated atmosphere containing residual oxygen not combined chemically with any other chemical element, thereafter conducting electrical current only through said cladding to heat said cladding to a temperature at which the yield strength of said cladding substantially reduced and while said element is maintained at said temperature, adding a gas to apply pressure uniformly to said cladding of a magnitude sufficient at said temperature to collapse said cladding uniformly on the outer surface of said pellets of said stack while said element maintains its radial symmetry, the outer surface of said cladding being oxidized at said temperature by said residual oxygen, the said processing, precluding the formation, by exposure to neutron flux, over the anticipated period of time over which said element will later be in use in said nuclear reactor, of an unsupported axial gap on said cladding which would collapse under the pressure or at the temperature of the coolant of said nuclear reactor.

4. The method of claim 3 including applying isostatic pressure to collapse the cladding.

5. The method of processing an element of a nuclear reactor, preparatory to installation of said element in said nuclear reactor, to preclude the formation undesirably of an unsupported permanent axial gap in the cladding of said element over the anticipated time of use of the element in said nuclear reactor by reason of neutron bombardment of the element, which gap would be collapsible under the force exerted by the coolant of said nuclear reactor, said element including a stack of pellets enclosed in said cladding, the inner surface of the cladding prior to said processing being spaced from the outer surfaces of the pellets, said pellets being composed of one or more of the class consisting of uranium, plutonium, thorium and their compounds, zirconium oxide, and boron and its compounds and said pellets being of the same cross-sectional area so that their outer surfaces are coextensive forming a surface of the same radius throughout the length of the stack, said cladding consisting of one of the class of an alloy of zirconium and of stainless steel; the said method including: mounting said element in a container and evacuating said container from atmospheric pressure to a pressure such that said element is in an attenuated atmosphere containing residual oxygen not combined chemically with any other chemical element, thereafter conducting electrical current only through said cladding to heat said cladding to a temperature at which the yield strength of said cladding is substantially reduced and, while said element is maintained at said temperature adding a gas to apply uniform pressure to said cladding of a magnitude sufficient at said temperature to collapse said cladding uniformly on the outer surfaces of said pellets while each said pellet maintains its radial symmetry, the outer surface of said cladding being oxidized at said temperature by said residual oxygen, the said processing, precluding the formation, by exposure to neutron flux, over the anticipated period of time over which said element will later be in use in a nuclear reactor, of an unsupported axial gap in said cladding which would collapse under the pressure, and at the temperature, of said coolant of said nuclear reactor.

6. The method of claim 5 of processing a cylindrical element which is radially symmetric including applying isostatic pressure to collapse the cladding.

7. The method of processing a control element of a nuclear reactor, preparatory to installation of said element in said nuclear reactor, to preclude the formation undesirably of an unsupported permanent axial gap in the cladding of said element over the anticipated time of use of the element in said nuclear reactor by reason of neutron bombardment of the element which gap would be collapsible under the force exerted by the coolant of said nuclear reactor, said element including a stack of pellets enclosed in cladding, the inner surface of the cladding prior to said processing being spaced from the outer surfaces of the pellets, said pellets being composed of one or more of the class consisting of zirconium oxide and boron and its compounds and said pellets being of the same cross-sectional area so that their outer surfaces are coextensive forming a surface of the same radius throughout the length of the stack, said cladding consisting of one of the class of an alloy of zirconium and of stainless steel; the said method including: mounting said element in a container and evacuating said container from atmospheric pressure to a pressure such that said element is in an attenuated atmosphere containing residual oxygen not combined chemically with any other chemical element, thereafter conducting electrical current only through said cladding to heat said cladding to a temperature at which the yield strength of said cladding is substantially reduced and, while said element is maintained at said temperature adding a gas to apply uniform pressure to said cladding of a magnitude sufficient at said temperature to collapse said cladding uniformly on the outer surfaces of said pellets while said elements maintains its radial symmetry, the outer surface of said cladding being oxidized at said temperature by said residual oxygen; the said processing, precluding the formation, by exposure to neutron flux, over the anticipated period of time over which said element will later be in use in a nuclear reactor, of an unsupported axial gap in said cladding which would collapse under the pressure, and at the temperature, of said coolant of said nuclear reactor.

* * * * *